No. 766,774. PATENTED AUG. 2, 1904.
H. G. SEDGWICK.
APPARATUS FOR AUTOMATICALLY STOPPING RAILROAD TRAINS.
APPLICATION FILED APR. 28, 1903. RENEWED DEC. 7, 1903.
NO MODEL. 3 SHEETS—SHEET 1.
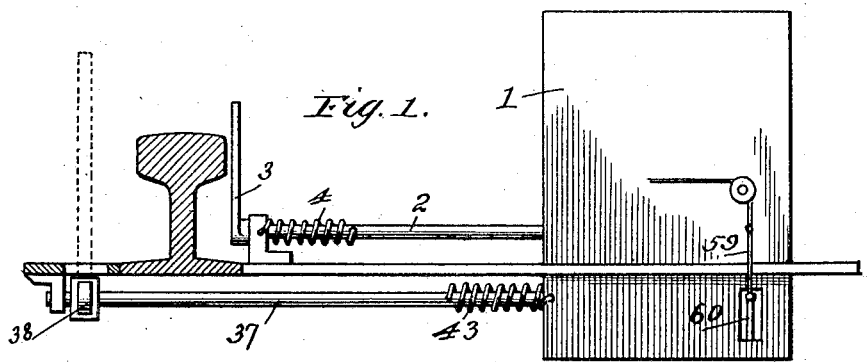
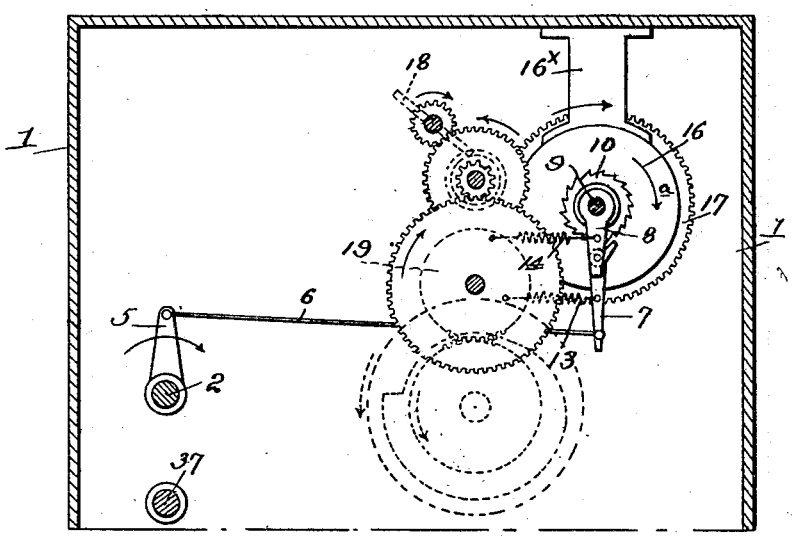
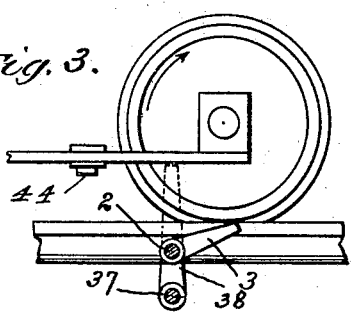
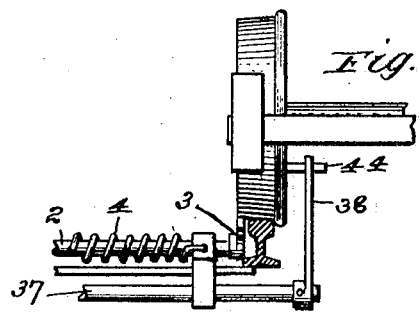
Witnesses
Edwin L. Yewell
R. W. Bishop
Inventor
Hiram G. Sedgwick
By his Attorneys Davis & Davis No. 766,774. PATENTED AUG. 2, 1904.
H. G. SEDGWICK.
APPARATUS FOR AUTOMATICALLY STOPPING RAILROAD TRAINS.
APPLICATION FILED APR. 28, 1903. RENEWED DEC. 7, 1903.
NO MODEL. 3 SHEETS—SHEET 2.

Witnesses
Edwin L. Yewell
R. W. Bishop

Inventor
Hiram G. Sedgwick
By his Attorneys
Davis & Davis

No. 766,774. PATENTED AUG. 2, 1904.
H. G. SEDGWICK.
APPARATUS FOR AUTOMATICALLY STOPPING RAILROAD TRAINS.
APPLICATION FILED APR. 28, 1903. RENEWED DEC. 7, 1903.
NO MODEL. 3 SHEETS—SHEET 3.

No. 766,774. Patented August 2, 1904.

UNITED STATES PATENT OFFICE.

HIRAM G. SEDGWICK, OF NEW YORK, N. Y.

APPARATUS FOR AUTOMATICALLY STOPPING RAILROAD-TRAINS.

SPECIFICATION forming part of Letters Patent No. 766,774, dated August 2, 1904.

Original application filed April 8, 1903, Serial No. 151,664. Divided and this application filed April 28, 1903. Renewed December 7, 1903. Serial No. 184,231. No model.)

*To all whom it may concern:*

Be it known that I, HIRAM G. SEDGWICK, a citizen of the United States, residing in the borough of Brooklyn, county of Kings, city and State of New York, have invented certain new and useful Improvements in Apparatus for Automatically Stopping Railroad-Trains, of which the following is a specification, reference being had therein to the accompanying drawings, in which—

Figure 5:
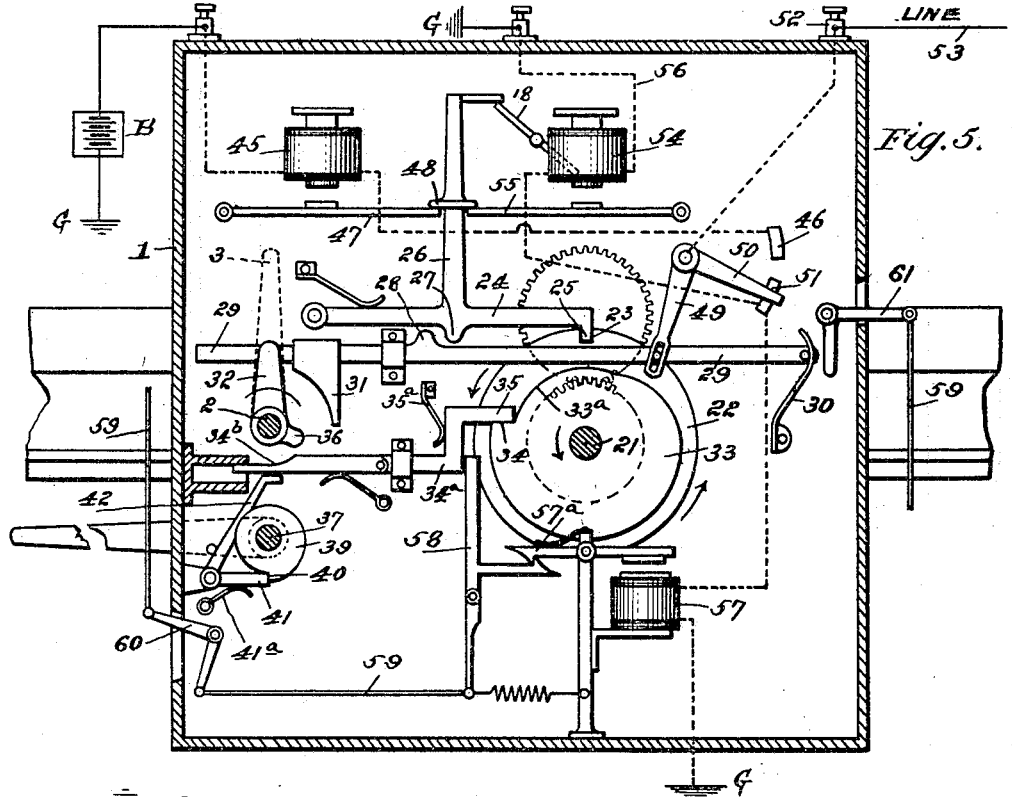
Figure 6:
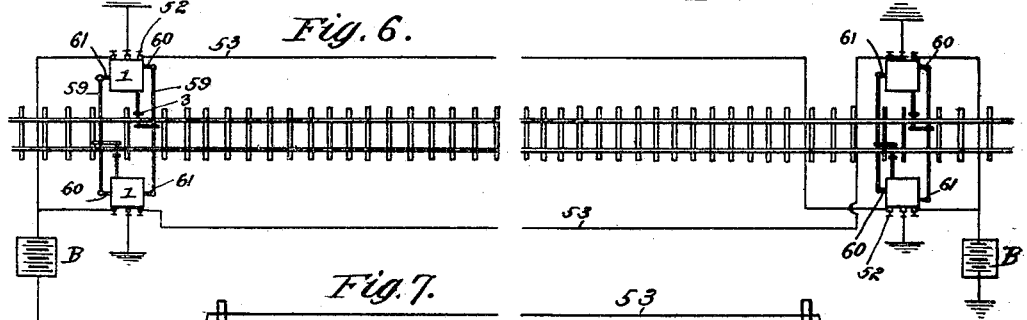
Figure 7:
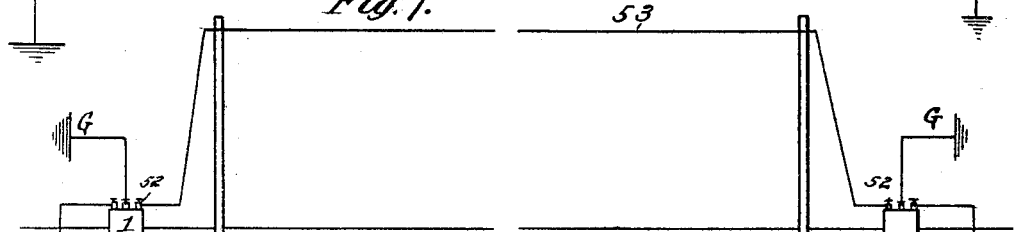
Figure 8:
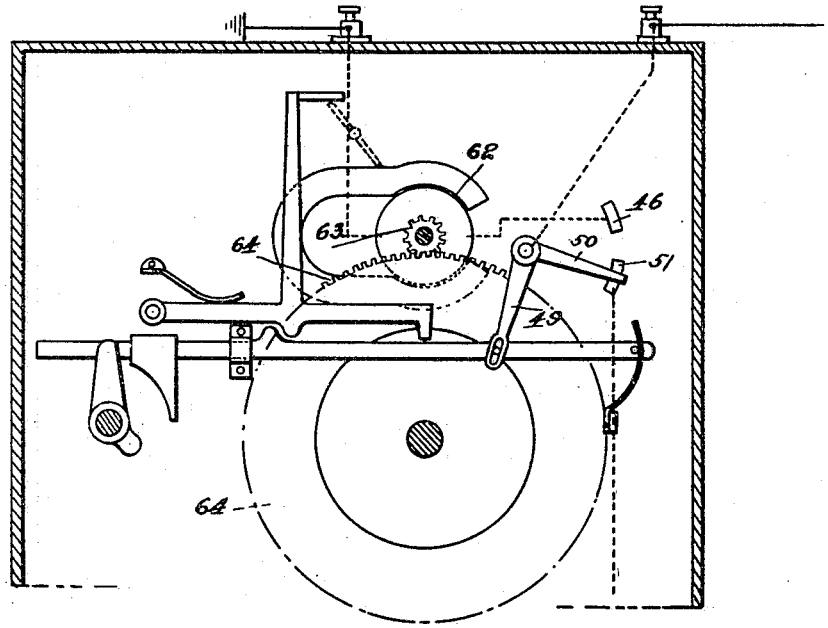
Figure 9:
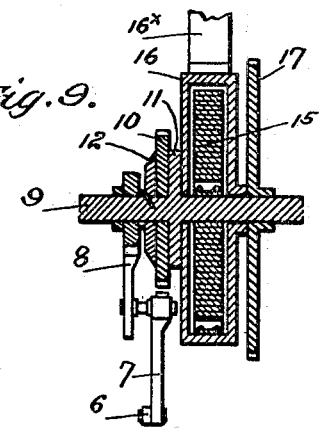
Figure 10:
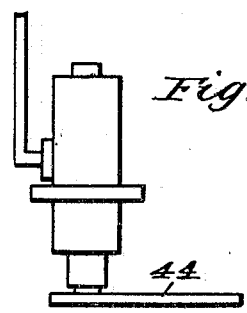
Figure 11:
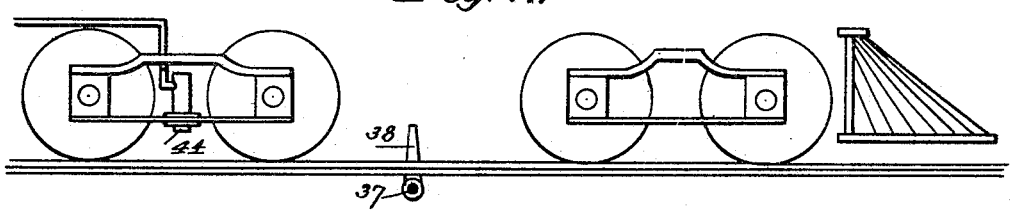

Figure 1 is a rear elevation of a stop-box, the adjacent railroad-rail being shown in section; Fig. 2, a vertical sectional view showing the motor mechanism; Fig. 3, a detail view showing the actuating-arm depressed by a car-wheel, the valve-operating arm being shown in its vertical or operative position; Fig. 4, a front elevation of the parts shown in Fig. 3; Fig. 5, a vertical sectional view of a stop-box; Fig. 6, a diagrammatic plan showing the arrangement of the invention on the road-bed; Fig. 7, a side elevation of the apparatus shown in Fig. 6; Fig. 7ª, a diagrammatic view showing the manner of connecting the mechanism of one box with the release mechanism of the adjacent box of the opposite series; Fig. 8, a sectional view of a stop-box, part of the mechanism being omitted and showing a small dynamo substituted for the batteries; Fig. 9, a detail vertical sectional view of the means for winding the motor, and Figs. 10 and 11 detail views illustrating the train-stopping mechanism carried by the train.

The object of this invention is to provide means whereby the train-stopping apparatus shown and described in my application, Serial No. 151,664, filed April 8, 1903, or a similar apparatus may be adapted for use on long blocks of railway-track, the stop-boxes being located at great distances from each other; and it consists in providing electrical means for operating a distant box from one that is mechanically operated by a passing train.

This invention is designed for use preferably in connection with that class of safety stop devices in which the brakes are automatically applied by venting the train-pipe by means of a valve-opening device located on the road-bed, this device being adapted to be adjusted to its set position to stop the train either automatically by the operation of a switch or signal or other track appliance or by simple means unconnected with other appliances. In the present application the invention relates particularly to the road-bed appliances, no change being made in the venting devices except to preferably arrange their valve-arms horizontally instead of vertically.

Referring to the various parts by letters and numerals, 1 designates a stop-box within which is contained the main portion of the apparatus. Mounted in this box and extending out through the side thereof nearest the track is a horizontal rock-shaft 2, on the outer end of which is rigidly mounted an actuating-arm 3, which extends upward close to the outer edge of the rail, its upper end projecting above the tread of the rail a suitable distance. Surrounding this rock-shaft, one of its ends being secured to said shaft and its other end being secured to a stationary part, is a strong coil-spring 4, which normally maintains the actuating-arm vertical. Within the stop-box 1 the rock-shaft 2 is provided with an upward-extending motor-winding arm 5, which is connected by a rod 6 with the depending longer arm of a pawl 7, this pawl being pivoted to a depending arm 8, loosely mounted on a horizontal shaft 9. On this shaft 9 is loosely mounted a ratchet-wheel 10, which bears against a disk 11, formed integral with said shaft. A spring-washer 12 bears against said ratchet-wheel and forces it against the disk 11 with considerable force, said spring-washer being rigidly connected to the shaft 9. The shorter arm of the pawl 7 engages this ratchet-wheel when the arm 5 is moved by a passing train in the direction of the arrow in Fig. 2, and the shaft 9 is thereby partially rotated. When the arm 5 returns to its normal position, the pawl 7 is disengaged from the ratchet-wheel by means of the spring 13 to leave the shaft 9 free to be rotated. A spring 14, connected to the depending pawl-carrying arm 8, returns said arm to its normal position when the arm 5 is at rest. Secured to the shaft 9 is one end of a clock-spring 15, the other end of said spring being connected to a stationary barrel 16, supported from the casing 1 by a hanger 16×. A large gear 17 is rigidly mounted on the shaft 9, which shaft is rotated by the spring 15. Connected to the gear 17 is a gear-train which actuates the governor-fan 18 and also rotates at a slow speed the driving-gear 19. This gear 19 meshes with a similar gear 20, mounted on the main shaft 21 of the apparatus.

The object of loosely mounting the ratchet-wheel 10 on the shaft 9 and forcing it against the disk 11 by means of the spring friction-washer 12 is to prevent the overwinding of the gear-train-driving spring 15. It is obvious that as soon as the tension on said spring has reached the desired point the ratchet-wheel will slip on the shaft, and thereby prevent overwinding of said spring. Any suitable stop mechanism to prevent the rotation of the shaft 9 when the proper tension of spring 15 is secured may be employed, if desired. Without the slip-ratchet overwinding would be caused by the passing of exceedingly long trains, by which the actuating-lever 3 would be depressed many times.

Of course I do not wish to limit myself to the use of a spring-motor, as a weight or other suitable motor may be utilized, if desired, and any suitable form of governor device may be used instead of the fan-governor 18.

Mounted on the main shaft 21, adjacent to the gear 20, is a timing-disk 22, in the periphery of which is formed a radial notch 23. Pivoted on the side of the casing is an arresting dog or pawl 24, whose forward end is formed with a depending finger 25, adapted to normally drop into the radial slot in the timing-disk. This arresting-dog carries an arm 26, whose upper end is adapted to extend into the path of the fan 18 when finger 25 is in notch 23 and normally hold said fan against rotation and through it stop the motor.

On the lower edge of the dog 24, about midway its ends, is a cam 27, which is adapted to be engaged by cam 28 on the upper edge of a reciprocable push-rod 29, mounted in suitable bearings and normally maintained in its rearward position by a spring 30. Formed on this push-rod near its rear end is a depending arm 31, the rear edge of which is adapted to be engaged by an upward-extending arm or crank 32 on the shaft 2 when the actuating-arm 3 is depressed by the wheels of a passing train. When this crank 32 is swung forward, it contacts with the arm 31 and forces the rod 29 forward. The cam 28, contacting with the depending cam 27 on the arm 24, raises the finger 25 from the notch of the timing-disk and lifts the arm 26 away from the governor-fan 18, thereby freeing the gear-train and permitting the timing-disk to be rotated in the direction indicated by the arrow in Fig. 3.

On the main shaft 21, adjacent to the timing-disk 22, is a setting-cam 33, formed with the radial shoulder 34. This cam is adapted to force rearward a presser-bar $34^a$, the forward end 35 of this bar bearing against the periphery of the cam. The rear end of this presser-bar is cut out at $34^b$ on its upper side, so that in its normal forward position it will permit the short crank-arm 36, mounted on the rock-shaft 2, to pass without contacting therewith. Below the main rock-shaft 2 is mounted a horizontal rock-shaft 37, which is parallel with the shaft 2 and whose outer end extends under the adjacent rail of the railroad-track and is provided at a point between the rails with a contact-arm 38, which acts in the present instance as a valve-opening arm and which normally lies in a horizontal position close to the road-bed. Within the stop box or casing 1 this rock-shaft 37 is provided with a locking cam or disk 39, and this disk is formed with a radial locking-shoulder 40, against which the forward end of the lower arm 41 of a trigger 42 abuts when the valve-actuating or contact arm is in its horizontal position, as clearly shown in Fig. 5 of the drawings. The upper end of the trigger lies close to the lower edge of the presser-bar 34 and directly below the rock-shaft 2. Surrounding the shaft 37 is a strong coil-spring 43, one of whose ends is rigidly secured to the rock-shaft, its other end being connected to a stationary part. This spring normally tends to maintain the valve-actuating arm in a vertical position. The arm 41, bearing at its forward end against the shoulder on the disk 39, locks said arm in its horizontal position and holds it against the action of the spring 43. The cam 33 is formed with the smaller concentric part $33^a$, so that when the timing-disk is released by the movement of the reciprocable push-bar 29 the cam 33 will make about one-fourth of a revolution and will then force the presser-bar rearward, bringing the enlarged part thereof over the trigger and directly under the crank 36 on the main rock-shaft 2. The main shaft 21 will rotate quite slowly, so that the actuating train of cars will have ample time to pass the arm 3 before the presser-bar is moved by the cam 33. This presser-bar will then be maintained in its rearward or "set" position during the remainder of the revolution of the setting-cam and the timing-disk, this period being determined by the speed of the timing-disk. This speed may be regulated so that the presser-bar will be held in its set position for any desired number of minutes, preferably five or six. By this means the actuating railroad-train will be protected from a following train from the time the presser-bar is set until it is forced forward to its normal position by the spring $35^a$ when the cam 33 has completed its revolution and the timing-disk has been arrested by the finger 24 dropping into the radial notch 23, and thereby permitting cam 36 to engage and stop fan 18. Should the following train, however, reach the set apparatus during the rotation of the timing-disk and after the presser-bar has been set, the depression of the wheel-actuated arm 3 would cause the crank 36 to contact with the presser-bar 34, and thereby depress the trigger 42, releasing the rock-shaft 36 and permitting the spring 43 to throw the valve-actuating arm 38 into its vertical operative position. The upper end of this arm will then be in position to contact with the horizontal arms 44 of the train-stopping mechanism on the train, thereby bringing the train to a standstill. This valve-actuating arm will remain in its upright position until it is forced to its horizontal position by a member of the crew of the stopped train, and the trigger-arm 41 is forced by its spring 41ª to engage the shoulder 40 on the locking-disk 39.

As stated, I prefer to use this apparatus in conjunction with an automatic train-stopping mechanism; but it is to be understood that I may use it with any other suitable form of train-stopping mechanism adapted to be mounted upon a train. It will of course be obvious that this train-stopping mechanism may be a brake-applying mechanism or means for exhausting the steam from the locomotive-boiler, or if the device is applied to an electrically-propelled train it may be a suitable switch-operating mechanism whereby the circuit will be broken and the motor stopped or the brakes applied. It will therefore be seen that I contemplate the use, in conjunction with my road-bed apparatus, of any suitable form of train-stopping mechanism that might be carried by a moving train and automatically operated by what I call my "contact-arm" or "valve-operating arm" 38.

In the present form of the invention the stop-boxes are located at great distances from each other on single-track roads, and it is necessary that the moving train be protected not only from a following train, but from an approaching train. In this arrangement of the apparatus two series of boxes are employed, those of one series being adapted to be operated by trains moving in one direction and those of the other series, preferably located on the opposite side of the track, being adapted to be operated by trains moving in the opposite direction, each box being electrically connected to the next box ahead of the opposite series.

Referring to Figs. 5, 6, and 7, electric batteries are arranged at stations, marked B, the current from said batteries passing to a magnet 45, located within each box, and from said magnet to a contact-plate 46. Below the magnet 45 is arranged a pivoted lifting-bar 47, on which is secured a suitable armature. The free end of this lifting-bar is arranged to engage under a lug 48 on arm 26 and to lift the arresting-dog free of the fan and the timing-disk when the current passes through the magnet 45. Connected to the push-rod 29 is an arm 49 of a pivoted switch-bar 50, said switch-bar being arranged to engage the contact-plates 46 and 51 during the movement of the push-rod 29. This switch-bar is electrically connected to a post 52, to which the line-wire 53 is connected, the other end of this line-wire being connected to a corresponding post 52 on the box ahead of the opposite series. Electrically connected to the contact-plate 51 is a magnet 54, which actuates a lifting-bar 55, whose free end is arranged to lift the arresting-dog free of the timing-disk, this magnet being connected to the ground through wire 56. A magnet 57 is also electrically connected to the contact-bar 51 and to the ground. This magnet is arranged to release a catch 57ª to free a setting-lever 58, which is arranged to force the presser-bar to its rearward position. The lower end of this setting-lever is connected by rods 59 and angle-lever 60 to an angle-lever 61 of the adjacent box of the opposite series, this latter box being usually located on the opposite side of the track. This angle-lever 61 is pivoted just above the forward end of the push-rod 29, one arm of said lever extending into the path of said push-rod, the other arm extending forward through the box-casing, its outer end being connected by the rod 59 to the outer end of the outward-extending arm of the angle-lever 60 of the adjacent box of the opposite series, as shown in diagram in Fig. 27ª.

The operation of this apparatus is as follows: When the push-rod 29 is vibrated by a passing train, the switch-bar 50 is moved into engagement with contact-plate 46 and the current flows from the battery through magnet 45, contact-plate 46, and the switch-bar to the line and actuates magnet 54 of the box ahead of the opposite series, the current flowing to said magnet through the stationary switch-bar 50 in the said box, said switch-bar being in engagement with its contact-plate 51. This magnet 54 lifts bar 55 and sets in motion the apparatus of said box. Current flows also from plate 51 through the magnet 57 to the ground and releases catch 57ª, permitting the setting-lever 58 to force rearward the presser-bar. It will therefore be seen that the apparatus in this box ahead will remain set until the actuating-train reaches the box at the end of the block and by moving the push-rod 29 and lever 61 of said box returns the setting-lever 58 to its normal position.

It will be noted that the line 53 is dead—that is, there is no current thereon, except when one of the switch-arms 50 is vibrated through its connected push-rod and that when said push-rod returns to its normal position the line is again dead.

The purpose of employing two magnets and two lifting-levers for releasing the setting mechanism is to stop both trains entering a block from opposite directions should they strike their respective stop-boxes at exactly the same moment. It will be noted that should this happen the latch 57ª in each box would be released through the magnets 57 and the setting-levers 58 be thereby freed to snap the presser-bar to its set position. The passing trains would then instantly throw the valve-actuating arms to their operative positions and both trains be stopped.

In Fig. 8 a small generator 62 is substituted for the batteries B and the magnets. The armature of this generator is provided with a small pinion 63, which meshes with a large driving-gear 64, mounted on the main shaft 21, which carries the timing-disk. One pole of this generator is connected to the ground and the other is connected to the plate 46. The line-wire is connected to the switch-bar 50, and plate 51 is connected to the magnet 57 and to the gronnd, as in Fig. 5. The operation of this form of the invention is as follows: As soon as the timing-disk is released the armature of the generator will be rapidly rotated by means of the large gear meshing with the very small gear 63, and current will be generated. This current, as soon as the trip-bar 29 is moved forward to throw the switch-arm 50 into contact with plate 46, will flash down the line 53 and operate to release the latch-bar 57ª and permit the lever 58 to force the trip-bar forward. A generator may be found to be more desirable and more efficient than the batteries B, for the reason that when the timing-disk is at rest there will be no current and all danger of leakage and consequent derangement of the apparatus will be avoided. It is of course to be understood that any suitable form of generator may be employed, either small magneto-generator or other form of dynamo.

It will also be observed that this apparatus may be used with advantage to simply sound an alarm on the train to be stopped, and thereby warn some member of the train crew to apply the brakes. I therefore wish it distinctly understood that where I use the expression "train-stopping mechanism" or similar expressions in the claims I do not intend to limit myself to the use of automatic train-stopping devices, although, as stated, my invention reaches its highest utility in connection with such automatic means.

Having thus described my invention, what I claim as new, and desire to secure by Letters Patent, is—

1. In a train-stopping apparatus the combination, of two series of stop-boxes one series being adapted to be operated by trains moving in one direction and the other by trains moving in the opposite direction, a presser-bar in each box, a train-actuated means in each box for moving said bar to its set position, electric means operated through the train-actuated means and connected to the next box ahead of the opposite series to set the presser-bar therein.

2. In a train-stopping apparatus the combination, of two series of stop-boxes one series being adapted to be operated by trains moving in one direction, and the other by trains moving in the opposite direction, a presser-bar in each box, a train-actuated means in each box for moving said bar to its set position, electric means operated through the train-actuated means and connected to the next box ahead of the opposite series to set the presser-bar therein, and means to lock said presser-bar of the box ahead in its set position.

3. In a train-stopping apparatus the combination, of two series of stop-boxes, one series being adapted to be operated by trains moving in one direction, and the other by trains moving in the opposite direction, a presser-bar in each box, a train-actuated means for moving said bar to its set position, electric means operated through the train-actuated means and connected to the next box ahead of the opposite series to set the presser-bar therein, and means to lock said presser-bar of the box ahead in its set position, and means in each box operated by a passing train to release the set presser-bar of the adjacent box of the opposite series.

4. A train-stopping apparatus comprising, two series of stop-boxes, one series being adapted to be operated by trains moving in one direction, and the other series being adapted to be operated by trains moving in the opposite direction, each of said boxes containing mechanism adapted to be brought to its set position by a moving train, a timing-disk, means for rotating said timing-disk, and electric means for setting the box ahead of the opposite series when the timing-disk of one box is rotated.

5. A train-stopping apparatus comprising, a pair of stop-boxes located at a distance from each other, a mechanism in each box adapted to be brought to its set position by a passing train, and electric means connected to said boxes for simultaneously setting the mechanism of the distant box when one box is set by a passing train.

6. An apparatus for stopping trains comprising, a train-stopping mechanism carried by a train, a stop-box adapted to be actuated by a train moving in the proper direction, and electric means connected to the stop-box for simultaneously actuating a stop-box at a distance.

7. An apparatus for stopping railroad-trains comprising, a train-stopping mechanism carried by a train, a stop-box located near the road-bed and adapted to be operated by a passing train, mechanism connected to said box and adapted to be brought to its set position by a passing train, and electric means for simultaneously setting the mechanism in a distant box.

8. An apparatus for stopping railroad-trains comprising, a train-stopping mechanism carried by a train, a stop-box located near the road-bed and adapted to be operated by a passing train, mechanism connected to said box and adapted to be brought to its set position by a passing train, electric means for simultaneously setting the mechanism in a distant box, and means for automatically locking the set mechanism of the distant box.

9. An apparatus for stopping railroad-trains comprising, a train-stopping mechanism carried by a train, a stop-box located near the road-bed and adapted to be operated by a passing train, mechanism connected to said box and adapted to be brought to its set position by a passing train, electric means for simultaneously setting the mechanism in a distant box, means for automatically locking the set mechanism of the distant box, and means actuated by a passing train for releasing said locked mechanism.

10. A train-stopping apparatus comprising, a mechanism adapted to be brought to its set position by a moving train, electric means for simultaneously setting the mechanism of a box at a distance, and means for locking the said mechanism in the distant box.

11. An apparatus for stopping railroad-trains comprising, a train-stopping mechanism carried by a train, two series of stop-boxes located near the road-bed, one of said series being adapted to be operated by trains moving in one direction and the other series being adapted to be operated by trains moving in the opposite direction, mechanism connected to each box and adapted to be brought to its set position by a train moving in the proper direction, and electrical means connecting the mechanism of each stop-box to the next box ahead of the opposite series whereby the two boxes thus connected will be set simultaneously, and mechanism connected to said stop-box whereby the train-stopping mechanism of a train passing either of said set boxes in the proper direction will be operated.

12. An apparatus for stopping trains comprising, a train-stopping mechanism carried by a train, two series of stop-boxes located near the road-bed, one of said series being adapted to be operated by trains moving in one direction, and the other series being adapted to be operated by trains moving in the opposite direction, mechanism connected to each box and adapted to be brought to its set position by a train moving in the proper direction, and electrical means connecting the mechanism of each stop-box to the next box ahead of the opposite series, whereby the two boxes thus connected will be set simultaneously, means for maintaining said boxes set for the desired length of time, and mechanism connected to said stop-boxes whereby the train-stopping mechanism of a train passing either of said set boxes in the proper direction will be operated.

13. An apparatus for stopping railroad-trains comprising, a train-stopping mechanism carried by a train, two series of stop-boxes located near the road-bed, one of said series being adapted to be operated by trains moving in one direction and the other series being adapted to be operated by trains moving in the opposite direction, mechanism connected to each box and adapted to be brought to its set position by a train moving in the proper direction, electrical means connecting the mechanism of each stop-box to the next box ahead of the opposite series whereby the two boxes thus connected will be set simultaneously, means for maintaining the rear box set for the desired length of time, and mechanism connected to said set boxes whereby the train-stopping mechanism of a train passing either of said boxes in the proper direction will be operated.

14. An apparatus for stopping railroad-trains comprising, a train-stopping mechanism carried by a train, two series of stop-boxes located near the road-bed, one of said series being adapted to be operated by trains moving in one direction and the other series being adapted to be operated by trains moving in the opposite direction, mechanism connected to each box and adapted to be brought to its set position by a train moving in the proper direction, electrical means connecting the mechanism of each stop-box to the next box ahead of the opposite series whereby the two boxes thus connected will be set simultaneously, means for maintaining the rear box set for a predetermined time, and mechanism connected to the said stop-boxes, whereby the train-stopping mechanism of a train passing either of said boxes in the proper direction will be operated.

15. An apparatus for stopping railroad-trains comprising, a train-stopping mechanism carried by a train, two series of stop-boxes located near the road-bed, one of said series being adapted to be operated by trains moving in one direction and the other series being adapted to be operated by trains moving in the opposite direction, mechanism connected to each box and adapted to be brought to its set position by a train moving in the proper direction, electrical means connecting the mechanism of each stop-box to the next box ahead of the opposite series, whereby the two boxes thus connected will be set simultaneously, a device to lock the mechanism of the box ahead, and means in each box adapted to be actuated by a passing train and connected to the locking mechanism of the adjacent box of the opposite series to release the set mechanism therein.

16. An apparatus for stopping trains comprising, a train-stopping mechanism carried by a train, two series of stop-boxes located near the road-bed, one of said series being adapted to be operated by trains moving in one direction and the other series being adapted to be operated by trains moving in the opposite direction, mechanism connected to each box and adapted to be brought to its set position by a train moving in the proper direction, electrical means connecting the mechanism of each stop-box to the next box ahead of the opposite series, whereby the two boxes thus connected will be set simultaneously, a device to lock the set mechanism of the box ahead, means to maintain the mechanism in the rear box set for a predetermined time, means in each box actuated by a passing train and connected to the locking mechanism of the adjacent box of the opposite series to release the set mechanism in said box.

17. An apparatus for stopping railroad-trains comprising, a setting mechanism, means for operating said setting mechanism, means for locking said setting mechanism out of operation, means actuated by a passing train to release the setting mechanism, means whereby an electric impulse will be sent from one setting mechanism to another located at a distance when said setting mechanism is released, and means whereby the distant mechanism will be set by said electrical impulse.

18. A train-stopping apparatus comprising, a setting mechanism, means for holding said setting mechanism out of operation, means operated by a passing train to release the setting mechanism, an electric generator, means whereby said generator will be simultaneously set in operation with the setting mechanism, and means whereby an electric impulse will be sent from said generator to a distant setting mechanism, and means whereby said electric impulse will operate mechanism to set the distant mechanism.

19. A train-stopping apparatus comprising, a setting mechanism, means for holding said setting mechanism out of operation, a push-bar for releasing the setting mechanism, means operated by a passing train to move said push-rod, a source of electric energy, and means whereby an electric impulse will be sent to a distant setting mechanism when the push-bar is moved.

20. An apparatus for stopping trains comprising, a setting mechanism, means for holding said mechanism out of operation, a push-bar to release said setting mechanism, means actuated by a passing train to move said push-bar, an electric generator connected to the setting mechanism and operated thereby, and means whereby an electric impulse will be sent from said generator to a distant setting means when the push-bar is moved and the setting mechanism is released.

21. A train-stopping apparatus comprising, a pair of stop-boxes one of which is adapted to be operated by trains moving in one direction and the other being adapted to be operated by trains moving in the opposite direction, mechanism in each box adapted to be brought to its set position by a train moving in the proper direction, means in each box for electrically setting said mechanism, a line-wire connecting said boxes, said wire being normally unconnected with a source of current, a source of electric current, and means whereby when the setting mechanism is actuated by a passing train an impulse of current will be sent over the line to actuate the setting mechanism of the distant box.

22. A train-stopping apparatus comprising, a pair of stop-boxes located at a distance from each other, and mechanism in each box adapted to be brought into operative position by a passing train, and electrical means connected to said mechanisms to simultaneously set in operative positions the mechanism of the distant box when the mechanism of one box is brought to its operative position by a passing train.

23. In an apparatus of the class described, the combination with a device on the road-bed for stopping a passing train, of means operated by another train for setting said device in operative position, and electrical devices adapted to connect the train-stopping device with another train-stopping device at a distance, whereby the two devices will be simultaneously brought to operative position.

24. In an apparatus of the class described, the combination with a train-engaging device on the road-bed for stopping a passing train, a setting device therefor, of means operated by another train for setting said setting device in operative position, and electrical means connected to said setting device and adapted to be connected to a distant setting device whereby the two devices thus connected will be simultaneously set.

In testimony whereof I hereunto affix my signature, in the presence of two witnesses, this 27th day of April, 1903.

HIRAM G. SEDGWICK.

Witnesses:
SAML. B. DICK,
MAUDE HARPER.